US011350506B1

(12) United States Patent
De Oliveira Fanti et al.

(10) Patent No.: US 11,350,506 B1
(45) Date of Patent: May 31, 2022

(54) ADAPTIVE ILLUMINATION CONTROL VIA ACTIVITY CLASSIFICATION

(71) Applicant: OBER ALP S.P.A., Bolzano (IT)

(72) Inventors: Raphael De Oliveira Fanti, Lavis (IT); Hannes Egarter, Bolzano (IT)

(73) Assignee: OBER ALP S.P.A., Bolzano (IT)

( * ) Notice: Subject to any disclaimer, the term of this patent is extended or adjusted under 35 U.S.C. 154(b) by 0 days.

(21) Appl. No.: 17/306,752

(22) Filed: May 3, 2021

(51) Int. Cl.
| | |
|---|---|
| *H05B 47/105* | (2020.01) |
| *H05B 47/11* | (2020.01) |
| *H05B 47/12* | (2020.01) |
| *G10L 15/22* | (2006.01) |
| *G10L 25/51* | (2013.01) |

(52) U.S. Cl.
CPC .......... *H05B 47/105* (2020.01); *H05B 47/11* (2020.01); *H05B 47/12* (2020.01); *G10L 15/22* (2013.01); *G10L 25/51* (2013.01); *G10L 2015/223* (2013.01)

(58) Field of Classification Search
CPC ...... H05B 47/12; H05B 47/11; H05B 47/105; F21V 23/0457; F21V 23/0464; F21V 23/0492; F21V 23/045; F21V 23/0478; F21V 21/00; F21V 21/10; F21V 21/084; F21V 23/0485; F21V 2107/30; G01C 11/00
See application file for complete search history.

(56) References Cited

U.S. PATENT DOCUMENTS

| | | | |
|---|---|---|---|
| 6,554,444 | B2 | 4/2003 | Shimada et al. |
| 7,370,991 | B1 | 5/2008 | Ellis-Fant |
| 8,297,776 | B2 | 10/2012 | Bandou |
| 8,378,587 | B2 | 2/2013 | Huguenin et al. |
| 8,746,914 | B2 | 6/2014 | Nelson et al. |
| 8,882,287 | B2 | 11/2014 | Taylor |
| 8,885,877 | B2 | 11/2014 | Publicover et al. |
| 8,894,231 | B2 | 11/2014 | Kwok |

(Continued)

FOREIGN PATENT DOCUMENTS

| | | |
|---|---|---|
| CN | 101155213 A | 4/2008 |
| CN | 105090760 A | 11/2015 |

(Continued)

*Primary Examiner* — Abdullah A Riyami
*Assistant Examiner* — Syed M Kaiser
(74) *Attorney, Agent, or Firm* — Sterne, Kessler, Goldstein & Fox P.L.L.C.

(57) ABSTRACT

Disclosed herein are embodiments for implementing active illumination control via activity classification. An embodiment includes a processor configured to perform operations comprising receiving first sensor data generated by at least one of the plurality of sensors. Based at least in part on the first sensor data, the processor may select a first lighting profile, and instruct the light-emitting element to emit light in accordance with the first lighting profile. The processor may be further configured to receive second sensor data generated by the at least one of the plurality of sensors and to update an activity classification stored in a memory, in response to the second sensor data being different from the first sensor data. The processor may transition from the first lighting profile to a second lighting profile, in response to the updating, and may instruct the light-emitting element to emit light in accordance with the second lighting profile.

30 Claims, 5 Drawing Sheets

(56) References Cited

U.S. PATENT DOCUMENTS

| | | | |
|---|---|---|---|
| 9,033,505 B2 | 5/2015 | Kim et al. | |
| 9,452,705 B2 | 9/2016 | Bouffay et al. | |
| 9,469,241 B2 | 10/2016 | Genthon et al. | |
| 9,495,589 B2 | 11/2016 | Strombom et al. | |
| 9,593,834 B2 | 3/2017 | Lee | |
| 9,609,722 B2 | 3/2017 | Law | |
| 9,648,692 B2 | 5/2017 | Bortolotti et al. | |
| 9,723,887 B2 | 8/2017 | Kim | |
| 9,862,303 B2 | 1/2018 | Nogha Mbai et al. | |
| 10,012,372 B2 | 7/2018 | Marie et al. | |
| 10,016,122 B2 | 7/2018 | Orringer et al. | |
| 10,066,818 B2 | 9/2018 | Ormsbee et al. | |
| 10,132,483 B1 | 11/2018 | Feinbloom et al. | |
| 10,178,743 B2 | 1/2019 | Bortolotti et al. | |
| 10,344,960 B2 | 7/2019 | Boesen | |
| 10,345,238 B2 | 7/2019 | Van Bommel et al. | |
| 10,539,788 B2 | 1/2020 | Shrubsole et al. | |
| 10,816,939 B1 * | 10/2020 | Coleman | G01S 17/86 |
| 11,002,437 B2 | 5/2021 | Ross | |
| 2008/0310145 A1 | 12/2008 | Blake et al. | |
| 2009/0251070 A1 | 10/2009 | Petzl et al. | |
| 2015/0003048 A1 | 1/2015 | Chang | |
| 2016/0258599 A1 | 9/2016 | Genthon | |
| 2016/0295658 A1 * | 10/2016 | Chraibi | H05B 45/12 |
| 2017/0231053 A1 * | 8/2017 | Underwood | H04L 67/12 |
| 2018/0136486 A1 * | 5/2018 | Macnamara | G02B 27/017 |
| 2018/0160085 A1 | 6/2018 | Bazin et al. | |
| 2018/0190095 A1 | 7/2018 | Leegate et al. | |
| 2018/0249054 A1 * | 8/2018 | Chien | H04N 5/2257 |
| 2020/0314986 A1 * | 10/2020 | Luijcks | H05B 47/105 |
| 2021/0112647 A1 * | 4/2021 | Coleman | G01S 17/89 |

FOREIGN PATENT DOCUMENTS

| | | |
|---|---|---|
| CN | 205919149 U | 2/2017 |
| CN | 106764594 A | 5/2017 |
| CN | 206280784 U | 6/2017 |
| CN | 107588340 A | 1/2018 |
| CN | 107816647 A | 3/2018 |
| CN | 107830432 A | 3/2018 |
| CN | 108443799 A | 8/2018 |
| DE | 10 2014 108 677 A1 | 12/2015 |
| DE | 10 2015 102 114 A1 | 10/2016 |
| DE | 20 2017 102 318 | 6/2017 |
| DE | 10 2017 108 315 A1 | 10/2018 |
| TW | 201542960 A | 11/2015 |
| WO | WO 2019/015612 A1 | 1/2019 |

* cited by examiner

ADAPTIVE ILLUMINATION CONTROL VIA ACTIVITY CLASSIFICATION

BACKGROUND

For people participating in physical activities, such as sports, recreation, cycling, exploration, orienteering, search and rescue, manual labor, for example, safety and speed of the activity may be compromised in environments where ambient light is variable. Especially for outdoor activities at night, dusk, or dawn, in inclement weather, in tunnels, mines, caves, or in other low-light or variable-light environments, participants may carry devices to provide illumination or supplement ambient light. For activities such as skiing, rock climbing, rafting, mountain biking, and so on, many participants use wearable illumination devices (e.g., helmet-mounted lights, head torches, headlights, headlamps, etc.), but adjusting light output may be difficult.

Because such activities may often require participants' hands to be engaged, and because ambient light may vary due to fast-changing environments or moving light sources, adjusting intensity or focus of the artificial light from portable illumination devices may be challenging or impossible for participants in certain situations. If the ambient light changes such that a participant's artificial light becomes too much or too little for the given situation, the participant may be at increased risk of accidents and/or may need to slow the progress of the activity. Even if the participant has enough time to make manual adjustments to the artificial light of a portable illumination device, such manual adjustments in the midst of certain physical activities may also result in similar safety risks and slowdowns.

Previous attempts at hands-free illumination devices have fallen short of the needs of many people who could benefit from such devices. Adjusting light output simply based on predetermined values of a light sensor on a portable illumination device fails to account for actual behavior or for a given activity that a user of the illumination device may be participating in, resulting in unsuitable light output for the given activity. Other attempts at "smart" illumination devices have other constraints, such as requiring pairing with Internet-enabled devices, or otherwise requiring access to certain communication networks, which may be unavailable in many places where illumination is needed, or which may require excessive power consumption.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer-program product (non-transitory computer-readable storage medium or device) embodiments, and/or combinations and sub-combinations thereof, for implementing adaptive illumination control via activity classification, capable of deployment in a wearable device or similar portable configuration.

According to the enhanced techniques disclosed herein, aspects of the present disclosure includes one or more systems or wearable devices to control adaptive illumination, which may be based at least in part on a classification of user activity and/or environmental conditions detected by sensors included in the systems or wearable devices.

As one example, a wearable device may include, but is not limited to, a helmet-mounted or head-mounted illumination device, fastened to the wearer via straps, belts, clips, or other suitable fasteners to attach to another garment, such as a hat or helmet. A wearable device may be attached to other garments or parts of the wearer's body, e.g., shoulder-mounted (via belts or harnesses), wrist-mounted (via bracelets or wristwatches), waist-mounted (via belts or harnesses), leg-mounted (via bracelets or harnesses) configurations, or the like, are also possible for such wearable devices to provide adaptive illumination as appropriate. In some use cases, such illumination devices may be mounted on or attached to other tools, vehicles, etc.

Figure 1:
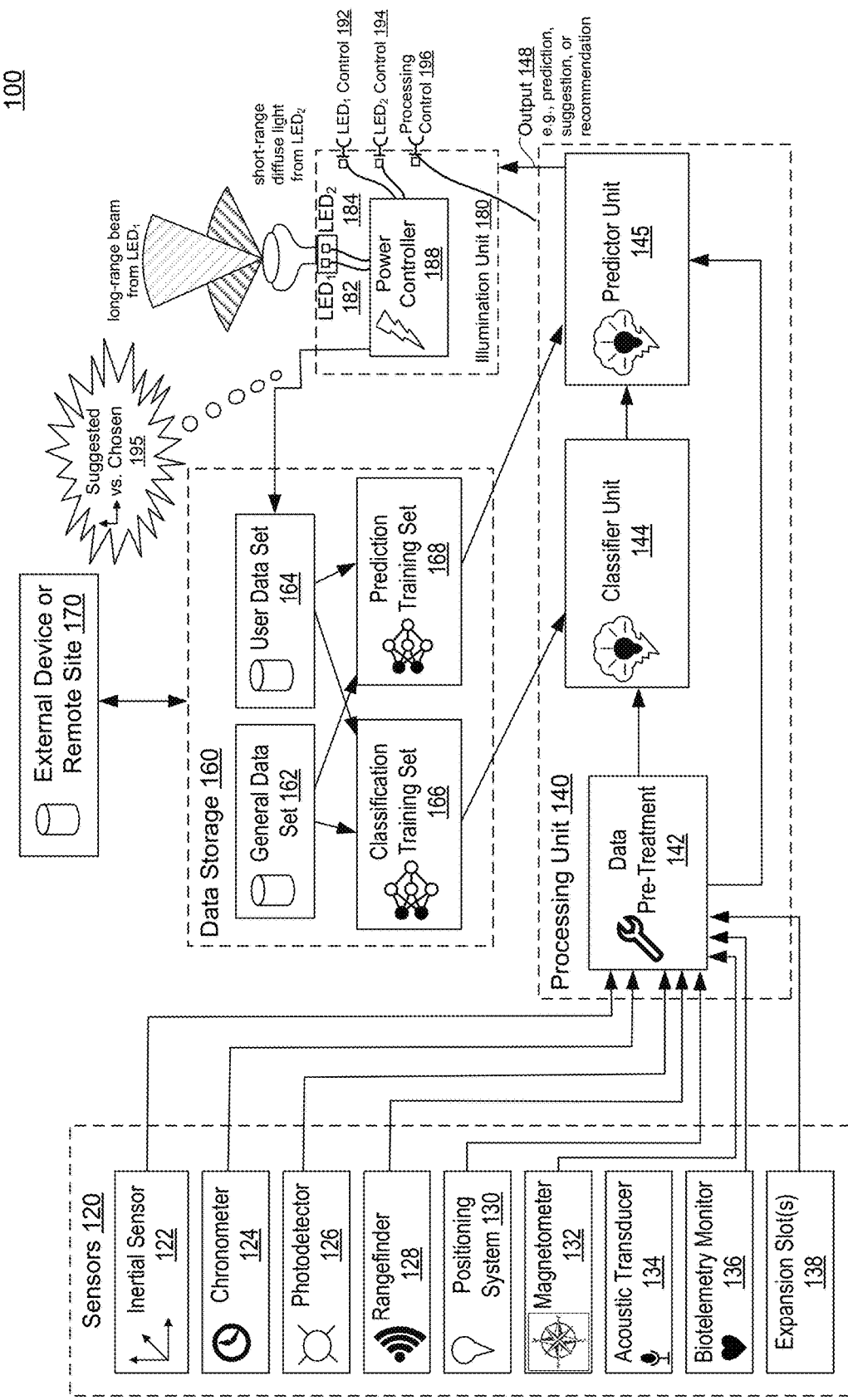
FIG. 1 is a schematic diagram depicting a system that may be implemented in a wearable device or similar apparatus to provide adaptive illumination, according to some embodiments of the present disclosure.

FIG. 1 is a schematic diagram depicting a system 100 that may be implemented in a wearable device or similar apparatus to provide adaptive illumination, according to some embodiments. For example, adaptive illumination may be provided via any controllable light source, including one or more light-emitting elements, such as at least one electric light (e.g., incandescent or electroluminescent), any equivalents, or any combination thereof.

A light-emitting element may be part of an array of multiple light-emitting elements, to increase intensity and/or to ensure redundancy, for example. In addition, multiple light-emitting elements may be independently controlled (e.g., including via separate buttons, switches, or other interface hooks), such as for different types of illumination (e.g., focused light beam, long-range, diffuse, short-range, different color/temperature ranges, intensity ranges, directionality, etc.). Control may be provided via at least one processor 504 and any accompanying circuitry (e.g., per FIG. 5 described further below).

A system or wearable device may include at least one sensor that may be used for measuring or detecting environmental states or related environment conditions, collecting a continuous, discrete, continual, or event-driven stream or signal generation, which may be logged at intervals or events and saved as specific data points.

For example, in addition to environmental sensors (e.g., inertial sensors, light sensors/photodetectors, sound sensors/ microphones), other sensors may be included, such as, a biotelemetry monitor, a geolocation device or position-tracking device, a flow-measurement device, any equivalents, or a combination thereof. For data logging, data points may include unique identifiers, types of sensors, types of data points, timestamps, links to other sensor data or data points, other related metadata, tags, any equivalents, or a combination thereof, according to some embodiments.

A device or system for adaptive illumination may include various interface objects to allow a user to control or configure specific aspects of the device, including enabling or disabling specific light-emitting elements or groups of light-emitting elements (e.g., switches or buttons for manually adjusting light output or turning light on or off), with adjustments enabled via physical or virtual knobs, sliders, buttons, switches, etc. Other interfaces may be used, including contactless interfaces such as motion sensors, cameras (image detection), microphones (sound signals or voice commands), and other programmatic interfaces (APIs) as may interface with other software or connected computing devices, for example.

Any of the above controls (e.g., sensor inputs or switches for manual override) may be used to disable certain aspects of the system or device (e.g., disable sensors or automatic control, disable data logging or activity classification, predictions, or specific computing modules), such as in order to conserve power when adaptive illumination may not be needed (when non-adaptive illumination may be sufficient).

In some embodiments, logged data points or control parameters may include at least one tuple, vector, matrix, or at least one further parameter indicating a degree to which a first parameter is applied (e.g., numeric scale of luminous intensity, color or temperature, direction, strobe frequency or pattern, etc.). In some embodiments, parameter may include an indication of whether or not a given sensor, light-emitting element, control sequence, or classification module may be active (e.g., on or off).

Depicted at the left-hand side of FIG. 1, for illustrative purposes, is a group of sensors 120. Non-exhaustive, non-limiting examples of sensors include at least one inertial sensor 122, chronometer 124, photodetector 126, rangefinder 128, positioning system 130, magnetometer 132, acoustic transducer 134, biotelemetry monitor 136, and expansion slots 138 for other compatible sensor modules, for some use cases in some embodiments.

Inertial sensor 122 may be a 6-axis inertial sensor, including accelerometer and/or gyroscope components (not shown) implemented, for example, using microelectromechanical systems (MEMS) or nanoelectromechanical systems (NEMS). Inertial sensor 122 may be provided as a module with various hardware and software interfaces, as well as on-board computer or controller components to provide calculations for interpreted sensor data at different orders of derivation or integration.

For example, inertial sensor 122 module may itself include embedded computing modules and interfaces by which the inertial sensor 122 module may provide values of speed or velocity, calculating a first-order integral of acceleration data obtained via the accelerometer component. Additionally, or alternatively, inertial sensor 122 may output raw data (e.g., accelerometer data, gyroscope data, other data, or combinations thereof) in various suitable formats.

Chronometer 124 may be a clock or watch, with an optional display for a user to tell the time therefrom. Additionally, or alternatively, system 100 may interface with chronometer 124 to obtain time readings or timestamps for ordering and aging time-sequenced data as received from any of the other sensors in the group of sensors 120.

Chronometer 124 may be implemented as a digital clock, e.g., with a timer circuit and/or crystal resonator, for example. Optionally, chronometer 124 may automatically synchronize with another time source, such as an atomic clock, via network protocols (e.g., Network Time Protocol (NTP) over the Internet) and/or via radio-frequency (RF) broadcast signals, e.g., for radio clocks.

Photodetector 126 may be any type of light sensor, light meter, or similar detector of electromagnetic radiation, particularly for detecting or measuring visible light. Photodetector 126 may be implemented via at least one photoresistor, photodiode, or other mechanism, material, or other device that may convert received light (e.g., ambient light, or other light shining on photoelectric element(s) of photodetector 126) into one or more electrical signals.

Photodetector 126 may include an array of photoelectric elements or similar light sensors, such as to form an image sensor or digital camera, in some embodiments. Photodetector 126 may be configured, for some use cases, to interpret distance or movement of objects, perform image recognition (e.g., using neural networks, computer vision, artificial intelligence, or similar techniques), and/or may, in combination with a light-emitting element, perform Time-of-Flight (ToF) measurements with respect to other objects.

The electrical signals may, according to some embodiments, be converted into discrete digital signals or values for digital data storage and transmission, for example. A photodetector 126 module, like inertial sensor 122 module, may also include embedded hardware and/or software and any suitable interface(s) for other modules, components, or computer hardware or software to interact with photodetector 126 to request, process, or obtain data about light received (sensed or detected) by photodetector 126.

Rangefinder 128 may include any variety of proximity sensor, e.g., SONAR, RADAR, LIDAR, or similar ToF measurement or detection of specific objects, or a scanning map of surrounding objects and/or terrain, or any combination thereof. A rangefinder 128 module, like inertial sensor 122 module, may also include embedded hardware and/or software and any suitable interface(s) for other modules, components, or computer hardware or software to interact with rangefinder 128 to request, process, or obtain data about scanning/mapping or ToF data determined by rangefinder 128.

Positioning system 130 may include at least one receiver and determination component for any variety of location or positioning system, e.g., global positioning system (GPS), GLONASS, BeiDou, NavIC, similar satellite-based system, a combination thereof, or equivalent thereof, for positioning and/or tracking of geographical position and/or movement.

A positioning system 130 module, like inertial sensor 122 module, may also include embedded hardware and/or software and any suitable interface(s) for other modules, components, or computer hardware or software to interact with positioning system 130 to request, process, or obtain data about geographic positioning/movement data determined by positioning system 130.

Magnetometer 132 may include a compass or compass-like device to determine an orientation of a magnetic field or direction of magnetic north. Magnetometer 132 may be implemented using MEMS or NEMS, as with inertial sensor 122. In some embodiments, magnetometer 132 may be integrated as a component in inertial sensor 122 module, for example.

A magnetometer 132 module, like inertial sensor 122 module, may also include embedded hardware and/or software and any suitable interface(s) for other modules, components, or computer hardware or software to interact with magnetometer 132 to request, process, or obtain data about geographic orientation or magnetic-field data determined by magnetometer 132.

Acoustic transducer 134 may be any type of sound sensor, sound meter, or similar detector of acoustic waveforms, particularly for detecting or measuring audible sound. Acoustic transducer 134 may be configured, for example, to detect subsonic or ultrasonic waveforms, in some embodiments. Photodetector 126 may be implemented via at least one microphone or array thereof, MEMS/NEMS, or other device that may convert received sound (e.g., mechanical compression wave(s) in an ambient medium such as air or water) into one or more electrical signals.

The electrical signals may, according to some embodiments, be converted to discrete digital signals or values for digital data storage and transmission, for example. An acoustic transducer 134 module, like inertial sensor 122 module, may also include embedded hardware and/or software and any suitable interface(s) for other modules, components, or computer hardware or software to interact with acoustic transducer 134 to request, process, or obtain data about audio signals or other sound data determined by acoustic transducer 134.

Biotelemetry monitor 136 may include a pulse oximeter, pulse counter, or other pulse tracker, for example. Respiratory tracker (e.g., for volume or composition of breath), movement tracker (e.g., for steps, cycles, altitude), or other tracker for physiological or health-related biotelemetry may be included or integrated via any number of controllers and/or interfaces.

A grouping or array of sensors 120 may be further configured to accommodate pluggable modules to add or remove various sensors and their corresponding functionalities. FIG. 1 shows biotelemetry monitor 136, and expansion slot 138, but other embodiments may have any number of expansion slots, and any number and type of other sensors included by default or as an option, for example, including thermometers, moisture detectors, substance detectors, etc.

Sensor data output from sensors 120 may be input into at least one processing unit 140. For further processing, processing unit 140 may include a module or component for pre-treatment of data, such as data pre-treatment 142. Data pre-treatment 142 may format raw data, or other sensor data in the form of calculations from the sensors (e.g., inertial sensor 122 derivations/integrations), may be formatted or reformatted by data pre-treatment 142.

Examples of actions that may be performed by data pre-treatment 142 include removing data from certain sensors, converting sensor outputs to certain predefined formats, filtering extreme values over or under predetermined thresholds to cut excess samples (or save data for later statistical compilations), binarizing, quantizing, vectorizing, other conversions, etc., as may be suitable for subsequent processing by processing unit 140. Processing unit 140 may be implemented via at least one processor 504 and memory, such as those of FIG. 5.

Processing unit 140 may further include at least one additional module, such as a classifier unit 144 and/or predictor unit 145. Processing unit 140, by way of any its internal computational modules or components (142-145), may output at least one prediction (in a form of a proposal, suggestion, recommendation, instruction, etc.) as output 148 to an illumination unit 180, described further below.

A suitable classification model, algorithm, routine, or equivalent process may be used by classifier unit 144, including neural-network-based machine-learning model(s), algorithm(s), routine(s), or equivalent process(es). The same type of processing, with at least one similar or different model, routine, algorithm, or other process, may be implemented with predictor unit 145, to apply a model or other type of rule(s) or decision logic to yield a prediction or calculation of what the output of the illumination unit 180 may be in the present or in a near-future state.

Classifier unit 144 may apply an activity classification, for example, to classify an activity in which system 100 (or a user of system 100) is presently engaged. Based at least in part on the activity classification generated or updated by classifier unit 144, predictor unit 145 may select or transition between different lighting profiles stored in memory, such as data storage 160, and provide output 148 to illumination unit 180, for controlling illumination output adaptively.

Data storage 160 may be a memory or storage device implemented via various electronic, electromagnetic, electromechanical, or other equivalent types of storage media, to store data in suitable formats for retrieval and updating via processing unit 140 or its component module(s). In some embodiments, data storage 160 may store at least one general data set 162. In further embodiments, data storage 160 may additionally store at least one user data set 164, which may be generated independently of general data set 162, or which may be a modified version of general data set 162, updated based on specific input(s) and/or behavior(s) of a corresponding user.

Data storage 160 may additionally store a classification training set 166 and/or a prediction training set 168. Either or both of the classification training set 166 or the prediction training set 168 may correspond to either or both of general data set 162 or user data set(s) 164. Classifier unit 144 of processing unit 140 may access classification training set 166 and/or either or both of general data set 162 or user data set 164, at least for purposes of classification (e.g., activity classification), which may, according to some embodiments, be refined for a particular user using user data set 164.

Additionally, or alternatively, predictor unit 145 of processing unit 140 may access prediction training set 168 and/or either or both of general data set 162 or user data set 164, at least for purposes of calculating prediction(s) (e.g., instructions, proposals, or recommendations for control of illumination unit 180), which may, according to some embodiments, be refined for a particular user using user data set 164.

Any of the data stored in data storage 160 may read or write its data via local or remote machines, e.g., via networks or other interconnects, to synchronize, mirror, or update its stored data with respect to other machines, databases, repositories, etc. According to some embodiments, at least one of the data sets or training sets stored in data storage 160 may be synchronized or updated using a more refined or more accurate data set or training set, such as from a trusted repository or source of truth.

Illumination unit 180 may include any number of light-emitting elements. In some embodiments, illumination unit 180 may further include at least one control unit 186. Additionally, or alternatively, a corresponding control unit may be present as a module or component of processing unit 140, e.g., control unit 146 (not shown).

According to some embodiments, light-emitting elements 181 may be controllable individually or as functional groups of multiple light-emitting elements, for increased intensity and/or redundancy. Independent power switches for separate light-emitting elements (or functional groups thereof), may be, for example, labeled LED1 182 and LED2 184, such as for separate arrays of light-emitting elements.

In this example, LED1 182 may be an array of light-emitting diodes (LEDs) configured in a pattern to allow for a focused, intense light beam for relatively long-range illumination in a given direction. By contrast, LED2 184 may be a separate array of LEDs configured to allow for diffuse lighting for relatively near illumination at a relatively wide angle of view.

Additionally, according to some embodiments, each of the multiple light-emitting elements or functional groups thereof may have at least one manual override switch 190 (button, knob, rocker, slider, etc.) for a user to control or adjust light output manually, e.g., for each of LED1 182 (LED1 control 192) and LED2 184 (LED2 control 194) independently, e.g., on/off switch, dials to adjust color, brightness, focus, strobe, etc.

In some further embodiments, one or more additional manual override switches (e.g., processing control 196) to accept or reject predictions, suggestions, or recommendations from the output 148 to illumination unit 180, which may in turn feed back into user data set 164 or training sets 166, 168 in data storage 160 (as suggested vs. chosen 195). Similarly, any buttons, knobs, rockers, sliders, etc., may be equipped on or alongside illumination unit 180 (or any of the other units 120, 140, 160, etc.), to disconnect or disable some or all of the sensor, processing (including switching AI or classifier functionality on/off), data storage, or other smart features and certain computing functionality that may be equipped with an illumination device to make it an adaptive illumination device.

Even with such manual overrides, some embodiments may allow for sensors 120, processing unit 140, data storage 160, or any combination thereof, to register events of manual overrides with present sensor data, classifications, predictions, other instructions, etc., for purposes of improving various models, algorithms, routines, or other equivalent processes for classification, prediction, or both. In some embodiments, this user input in response to the output 148 of processing unit 140 may be fed back into user data set 164, and other training sets 166 and 168 for future calculations. This feedback, in terms of what is suggested by output 148 versus what is chosen by users in response (e.g., suggested vs. chosen 195), may further make the adaptive illumination unit more adaptive and suited to a user's needs over time. As a result, such and adaptive illumination device may operate better for the user, with less intervention or manual control from the user, the more often the adaptive illumination device is used.

Figure 3:
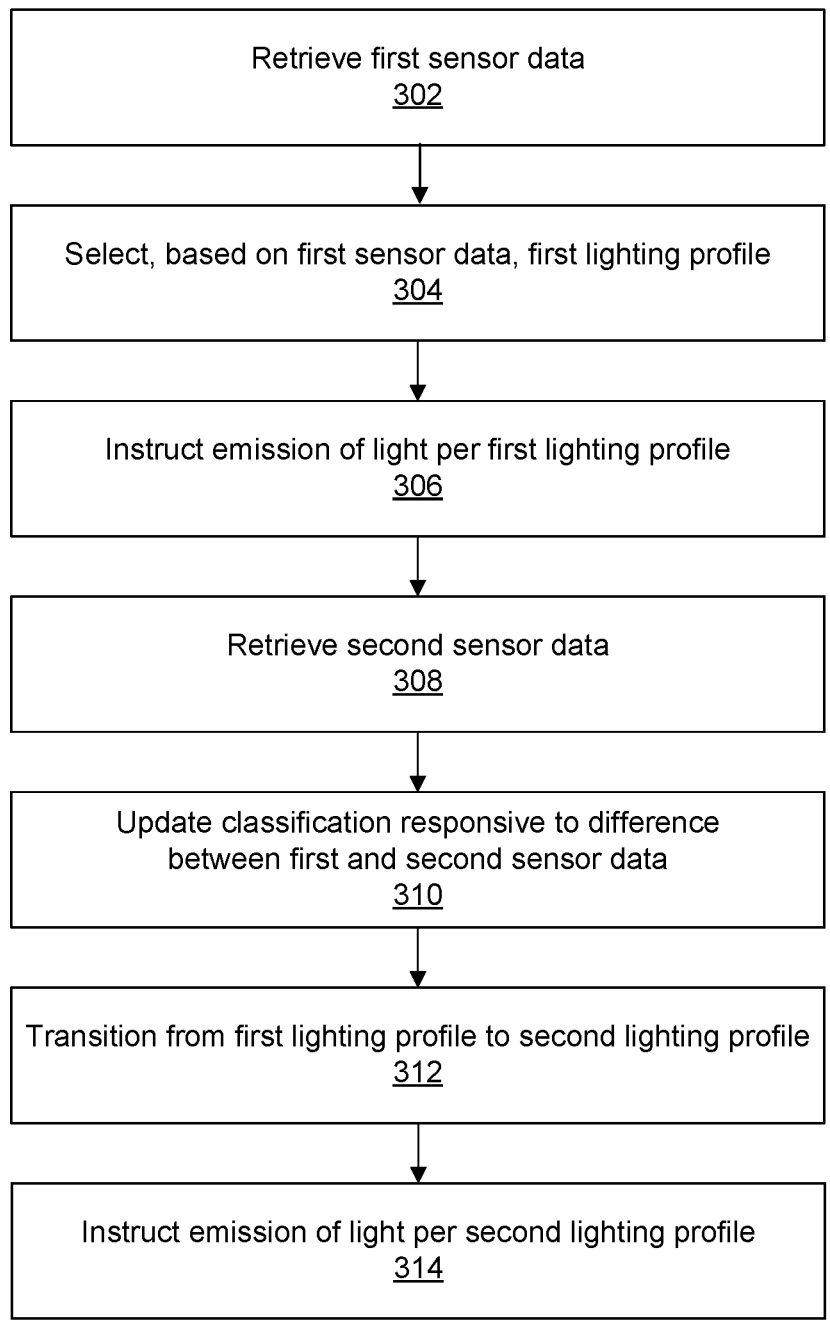
FIG. 3 is a flowchart illustrating a process implementing some of the enhanced techniques described herein, according to some embodiments of the present disclosure.

The combination of processing devices, sensors, and other accompanying circuitry, as shown in FIG. 1 may serve to illustrate a non-limiting example of an adaptive-illumination system or device, the operation of which is described more broadly with respect to FIG. 3, for example.

Figure 2:
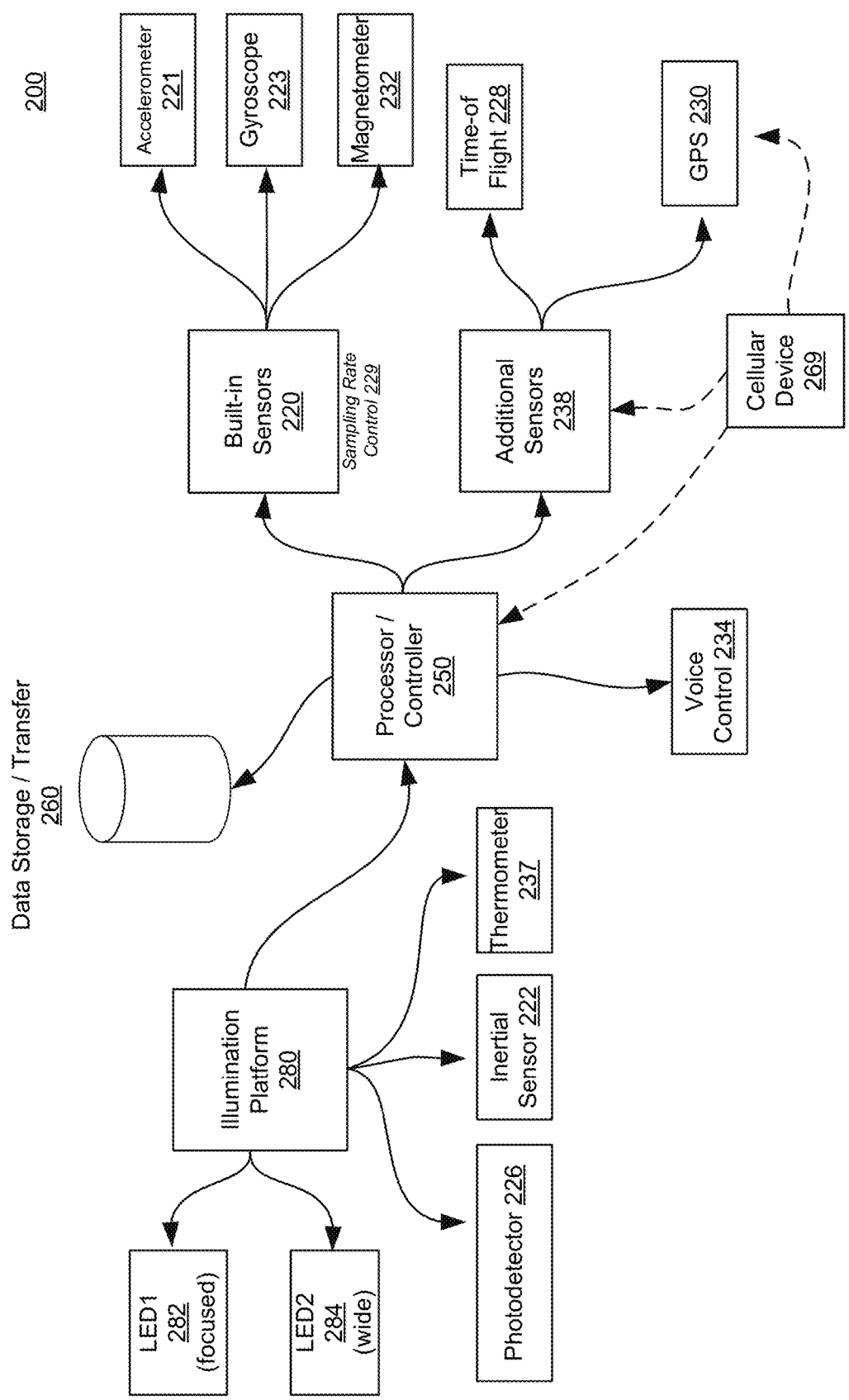
FIG. 2 depicts an example of inputs and control flow for adaptive illumination, according to some embodiments of the present disclosure.

FIG. 2 depicts an example of inputs and control flow for adaptive illumination, according to some embodiments of the present disclosure. In particular, FIG. 2 shows a configuration of a system or wearable device as an adaptive-illumination platform for multiple light-emitting elements (e.g., LED1 282 and LED2 284 for focused and wide-spread light beams, respectively), as an alternative embodiment of the system of FIG. 1. Each of the light-emitting elements (or functional groups thereof) may have corresponding independent power controls (not shown) in illumination platform 280, and which may be communicatively coupled, directly or indirectly, with processor or controller 250, including at least one processing unit (e.g., processor 504 or the like), such as may be in a power controller such as power controller 188 of FIG. 1, according to some embodiments.

In addition to certain built-in sensors 220, e.g., accelerometer 221, gyroscope 223, and magnetometer 232, communicatively coupled with the processor or controller 250, there may also be additional sensors 238 coupled directly or indirectly with processor or controller 250, including a GPS 230 or other positioning device, time-of-flight 228 device, or other type of proximity sensor or rangefinder device, or other sensors.

In some embodiments, further sensors may be communicatively coupled with illumination platform 280, e.g., photodetector 226, inertial sensor 222, thermometer 237, etc. Illumination platform 280 and any included sensors may be provided by a third party as a stand-alone product to be further enhanced by processor or controller 250, data storage or transfer 260, and any built-in sensors 220 or additional sensors 238, for example. Thus, according to some use cases, there may be multiple instances of the same type of sensor in a given system 200, added to and/or provided with a separately available platform product, e.g., illumination platform 280.

Moreover, according to some example embodiments, a sampling rate of at least some of the sensors (e.g., built-in sensors 220) in a given system 200 may be controlled via at least one sampling-rate control 229, as may be allowed within any constraints of available sampling rates for each sensor individually or multiple sensors collectively. Depending on a classified activity and/or other parameters (e.g., acceleration/speed, brightness of ambient light, manual control, etc.), a sampling rate of any sensor may be adjusted up or down.

For example, sampling rates of certain sensors may be increased to increase precision or accuracy of measurements at higher speeds (e.g., for any of built-in sensors 220 and/or additional sensors 238), or in different lighting conditions. Conversely, sampling rates may be reduced, such as when moving at lower speeds. In addition, other factors may lead to reduced sampling rates, such as a need or desire to reduce noise in measurements and/or to reduce energy consumption of a sensor or of the system 200 as a whole. According to some use cases, sampling-rate control 229 may be part of a lighting profile and/or may interface with any of the classifier, predictor, or AI/ML components described elsewhere herein.

In some embodiments, a wireless-communications device (cellular device 269), e.g., smartphone, tablet, or other cellular device, may be communicatively coupled with processor or controller 250 or any additional sensors 238, or to provide extended functionality of any sensors that may be included with the cellular device 269, e.g., GPS 230.

Various other implementations of computing or control devices, memory, or other electronic data storage, may be connected as appropriate. Optionally, communications link (s) or network technology may be integrated or modularly attached to enable data transfer to external devices or to remote sites.

In addition, the platform has multiple sensors communicatively coupled to the at least one processing unit. Sensors may include one or more photodetectors, temperature sensors, inertial sensors, magnetometers (e.g., compasses), or a combination thereof. Additionally, or alternatively, additional sensors, such as rangefinders (e.g., proximity sensors, ToF sensors, or equivalent), location/positioning systems (e.g., global positioning system (GPS) or equivalent), other sensors or other functionalities that may be added via another computing device (e.g., mobile or handheld computer, tablet computer, smartphone, smartwatch, etc.), may be communicatively coupled with the system or wearable device as the adaptive-illumination platform as described elsewhere herein.

Operational examples of the example hardware embodiments depicted in FIGS. 1 and 2 may be seen in terms of functional and logical operation, as described below and depicted in FIGS. 3 and 4, and may be supplemented with further implementation details as additionally described with respect to FIG. 5. These examples provided by way of FIGS. 1-5 and accompanying descriptions are intended to be illustrative, not prescriptive, exhaustive, or otherwise limiting.

FIG. 3 is a flowchart illustrating a method 300 for operation of the enhanced database platform integration techniques described herein, according to some embodiments. Method 300 may be performed by processing logic that may comprise hardware (e.g., circuitry, dedicated logic, programmable logic, microcode, etc.), software (e.g., instructions executing on a processing device), or a combination thereof. Not all steps of method 300 may be needed in all cases to perform the enhanced techniques disclosed herein. Further, some steps of method 300 may be performed simultaneously, or in a different order from that shown in FIG. 3, as will be understood by a person of ordinary skill in the art.

Method 300 shall be described with reference to FIGS. 1, 2, 4, and 5. However, method 300 is not limited only to those example embodiments. The steps of method 300 may be performed by at least one computer processor coupled to at least one memory device. An example processor and memory device(s) are described above with respect to FIG. 5. In some embodiments, method 300 may be performed by components of systems shown in FIGS. 1, 2, and 4, which may further include at least one processor and memory, such as those of FIG. 5.

In 302, at least one processor 504 may be configured (e.g., via program code or instructions stored in/on a non-transitory computer-readable storage medium or device) to receive first sensor data (e.g., via a data stream or retrieved from a data set) generated by at least one sensor of a plurality of sensors. In an example use case, the plurality of sensors may include, but is not limited to, an inertial sensor, a photodetector, a microphone, or a combination thereof, communicatively coupled with a wearable adaptive-illumination device or system that also includes a light-emitting element, such as an electric light or similar lamp-type device.

Processor 504 and/or any storage media storing instructions may be disposed in or on the same device or system, or may be communicatively coupled thereto via a communication line or wireless link with another computing device client device, such as another wearable device, a handheld computing device, mobile computing device, or other general-purpose computing device, for example.

Any sensor of the plurality of sensors may communicate directly with processor 504 or via any number of buses or input/output controllers, hardware- or software-based interfaces, libraries, application programming interfaces (APIs), data loggers or other storage mechanisms for data sets, network protocols for publication or subscription, or other communication protocols, such as Message Queue Telemetry Transport (MQTT) or Advanced Message Queuing Protocol (AMQP), to name a few non-limiting examples.

In 304, processor 504 may be configured to select a first lighting profile stored in the memory, based at least in part on the first sensor data. In some example use cases, a lighting profile may be a specific configuration, a set of parameters, a set of constraints, a set of rules, or a combination thereof, defining behavior of a light source or specific light-emitting element(s) in/on a device or system for adaptive illumination, according to some embodiments.

A lighting profile may define, to name a few non-limiting examples, electrical input characteristics for specific electric light(s), luminous flux or luminous intensity values for individual or combined outputs of one or more light-emitting elements, a ratio of light output to calculated or detected ambient light, a range of values or thresholds for specific events such as adjusting specific parameters of light output, or any combination thereof. Multiple light profiles may be configured and/or stored, such as in a memory or storage device, to be edited or retrieved later, for use with adaptive illumination in response to various controls or environmental stimuli received via at least one sensor.

In 306, processor 504 may be configured to instruct the light-emitting element to emit light in accordance with the first lighting profile. To instruct the light-emitting element to emit light in accordance with the first lighting profile, processor 504 may communicate directly with the light-emitting element(s) or via any number of buses or input/output controllers, hardware- or software-based interfaces, libraries, APIs, network protocols, or other communication protocols. Depending on a previous state of the light-emitting element or any corresponding lighting profile, an actual light output of the light-emitting element may change in response to being instructed to emit light in accordance with the first lighting profile. If the light-emitting element is already emitting light in accordance with the first lighting profile as defined, then the existing state of the light-emitting element may persist without change in response to being so instructed.

In 308, processor 504 may be configured to receive second sensor data (e.g., via a data stream or retrieved from a data set) generated by the at least one sensor of a plurality of sensors. In an example use case, the plurality of sensors may include, but is not limited to, an inertial sensor (e.g., including gyroscope and/or accelerometer), a photodetector (e.g., photoresistor, photodiode, or similar sensor, material, or device configured to convert light into electrical and/or mechanical signals), a microphone (e.g., transducer or other sound sensor configured to convert an acoustic wave into an audio signal electrically and/or mechanically), or a combination thereof, communicatively coupled with a wearable adaptive-illumination device or system that may also include a light-emitting element, such as an electric light or similar lamp. The second sensor data may originate from the same sensor(s) as did the first sensor data, or the second data may originate from a different sensor or combination of different or same sensor(s) compared with the source(s) of the first sensor data. Additional examples are described further herein.

In 310, processor 504 may be configured to update a classification stored in the memory, in response to the second sensor data being different from the first sensor data, wherein the classification corresponds to an activity, according to some embodiments. A difference between the first sensor data and the second sensor data may signify a change in environmental conditions as detected by sensors, e.g., changes in ambient light, position, attitude, acceleration, noise, etc. In some use cases, differences in sensor data may result from other types of hands-free control of a given device or system by a user, e.g., nodding, shaking, turning, or other specific motion of the user's head, body, or other part thereof, audible commands, hand signals, etc.

According to some embodiments, a classification may be an activity classification, which may correspond to an activity in which an applicable device or system is being used for providing adaptive illumination. In some use cases, the classification may identify one or more present activities and/or present environmental conditions with which those activities may be occurring. For example, an activity classification may include hiking, jogging, biking, climbing, skiing, etc. Other classifications may include weather, terrain, acceleration, or other variables, separately or in combination with activity classifications or any other classifications.

When performing adjustments, such as by transitioning to another lighting profile and/or instructing light output in accordance with a given profile, etc., the transitioning and/or instructing may be performed in accordance with activity-specific rules, which may be set in advance to implement domain-specific knowledge for each corresponding activity, and selected on the fly in response to an activity classification, which may be updated via processor 504 per 310 as described above.

In some embodiments, generating or updating a classification may involve any number of classification algorithms, any related data structures, or similar processes, e.g., probabilistic or predictive forecasting model, hidden Markov model, Kalman filter (FKF, LQE, etc.), Bayesian inference, Gaussian process, k-means clustering, kernel perceptron, multi-layer perceptron, kernel machine, support-vector machine (SVM), change-point detector, convolutional neural network (CNN) or other artificial neural network (ANN), regression analysis decision tree, random forest, supervised or unsupervised machine learning (ML) model or equivalent process, listing only a few non-limiting examples. For classification, including ML-based classification, training, or related processes, a given device or system may store its own classification models and data sets locally, giving preference to its locally collected models and data sets and over predefined models or preloaded training data (default data sets) or the like, for example.

Depending on available computing power and energy sources, certain techniques may perform better under certain constraints, e.g., requiring low power consumption, or limited network communications, or no remote processing of sensor data or other data sets related to classification, in some use cases. Wearable devices for adaptive illumination may include at least one artificial intelligence (AI)-enabled low-power edge-device controller, alongside or integrated with at least one processor 504, to perform, or assist with performing, classification, such as activity classification, using any of the techniques described herein.

In 312, processor 504 may be configured to transition from the first lighting profile to a second lighting profile stored in the memory, in response to the updating of 310. To perform this transition, processor 504 may substitute the first lighting profile with the second lighting profile in a given memory location, or may redirect a given reference or indirection to a different memory location in which the second lighting profile is stored, for example.

The transition may be triggered in response to the updating of 310, such as where the updating of 310 changes a present classification to a new classification value that may correspond to a different lighting profile in comparison with a previous classification value, in some example use cases. According to some embodiments, predefined safety overrides or other similar types of rules may prevent certain transitions, or may prevent or limit certain actions in response to certain transitions. For example, if a transition from a first lighting profile to a second lighting profile may exceed operating specifications of a given light-emitting element, or may cause a change in light output above a predetermined threshold, processor 504 may, at least temporarily, modify the second lighting profile, and/or may add or modify an instruction (per 314 below) to maintain light output within safe levels.

In 314, processor 504 may be configured to instruct the light-emitting element to emit light in accordance with the second lighting profile. To instruct the light-emitting element to emit light in accordance with the second lighting profile, processor 504 may communicate directly with the light-emitting element(s) or via any number of buses or input/output controllers, hardware- or software-based interfaces, libraries, APIs, network protocols, or other communication protocols. Depending on a previous state of the light-emitting element or any corresponding lighting profile, an actual light output of the light-emitting element may change in response to being instructed to emit light in accordance with the second lighting profile.

In further embodiments, processor 504 may be configured to detect changes in the operating environment of a given device or system that includes processor 504 and any sensor(s) for which a given state may change to a new state. A sensor may be configured to generate a signal based on a stimulus or an environmental state. Responsive changes in the stimulus or environmental state, a given sensor may generate a different signal. In this way, changes in environment, or changes in a state of a sensor, may be detected via processing of data streams or stored data, e.g., by a data logger or in comparison with data sets or models built therefrom.

For instance, via a sensor such as a photodetector (e.g., photoresistor, photodiode, or other light sensor) or array thereof, processor 504 may be configured to detect a lighting change outside the device or system that includes processor 504, from a first lighting state to a second lighting state, based at least in part on a first signal generated by the photodetector being different from a second signal generated by the photodetector. Thus, processor 504 may be configured to evaluate a lighting difference between the first lighting state and the second lighting state, based at least in part on the lighting change as detected via the photodetector(s).

Following the above example of the ambient light difference, processor 504 may be configured to determine, based at least in part on the lighting difference, that at least one first threshold of the first lighting profile has been crossed. In response to the determining that the threshold has been crossed, processor 504 may perform any of the operations of updating, transitioning, and/or instructing (310, 312, and/or 314) as described above. Thus, with a significant increase or decrease in ambient light, the light output of the light-emitting element may be increased or decreased in accordance with a corresponding lighting profile.

It may be understood that a decrease in ambient light may not necessarily warrant a proportional increase in light output (luminous flux or luminous intensity) of the light-emitting element, because eyes of a person wearing an adaptive-illumination device, or of other persons nearby who may be participating in similar activities at the same time, may adjust to a certain extent to the darker surroundings, and may require less in the way of artificial illumination to continue with the activity. Similarly, a sudden increase in light detected by a photodetector may be indicative of another artificial light source, e.g., another person's wearable illumination device, and this type of event may warrant reduction or other softening (e.g., change in color temperature or focus) of light output, so as to avoid hurting the other person's eyes.

Lighting profiles, which may be preconfigured and/or otherwise trained via ML models and corresponding ML processes, may compensate for lighting changes using suitable or otherwise desirable levels of light for specific quantified values of ambient light, time of day, present or future activity (per a corresponding activity classification), and so on.

As an example of the threshold being crossed, if the lighting difference is large enough to warrant a change in the light output, such as via a different lighting profile, then processor 504 may perform any of the operations of updating, transitioning, and/or instructing (310, 312, and/or 314) accordingly, as described above. The threshold may prevent unnecessary updating, transitioning, instructing, or other operations, where the difference detected by certain sensors is not sufficient to warrant a change in the light output from the light-emitting element. In some embodiments, an upper threshold may be referenced, so as to avoid transitioning light profiles in response to what may be spurious data from a likely malfunction or misreading by a given sensor.

In some further embodiments, processor 504 and any accompanying circuitry may be configured to classify the activity state in which a corresponding device or system may be engaged, calculate a prediction of a light output for the light-emitting element suitable for a present or future environment of the device or system in consideration of the detected change in sensor state (reflecting a corresponding change in the ambient or operating environment of the device or system), based at least in part on the classifying, such as may include classification of the activity state. At least one ML model may be used as a basis for at least one of the classifying (activity classification) or of the calculating (prediction or recommendation). In some embodiments, separate models, training sets, algorithms, routines, or other processes may be used for classifying (e.g., activity classification) versus calculating (prediction or recommendation) or controlling (instruction) of light output, for example.

As another example embodiment, via a sensor or sensor array, such as at least one inertial sensor (which may include a gyroscope and/or an accelerometer), processor 504 may be configured to detect a change in speed, acceleration, rotation, orientation, angle, or other relative positioning of or outside the device or system that includes processor 504, from a first attitude state (or other inertial state) to a second attitude state (or another inertial state), based at least in part on a first signal generated by the inertial sensor being different from a second signal generated by the inertial sensor. Thus, processor 504 may be configured to evaluate an attitude difference (attitudinal difference) between the first attitude state and the second attitude state, based at least in part on the attitude change as detected via the inertial sensor(s).

Following the above example of the attitude difference based at least in part on the first or second data comprising acceleration data, orientation data, angular data, or a combination thereof, processor 504 may be configured to determine, based at least in part on the attitude difference, that at least one first threshold of the first lighting profile has been crossed. In response to the determining that the threshold has been crossed, processor 504 may perform any of the operations of updating, transitioning, and/or instructing (310, 312, and/or 314) as described above. Thus, with a significant change in attitude, the light output of the light-emitting element may be increased or decreased in accordance with a corresponding lighting profile.

It may be understood that the data measured and/or collected by inertial sensor(s) may provide meaningful inputs to a classifier model or classifier routine about a present activity in which a wearable device (or user thereof) is engaged. An attitude change of a head-mounted or helmet-mounted device, such as via orientation data or angular data, for example, may indicate a direction in which the wearer is looking. Extent of a change in speed or acceleration of a wearable device may be indicative of certain types of activities (e.g., downhill biking or skiing, motorized transportation, etc.), or may indicate a potentially dangerous situation or accident, which may warrant an emergency lighting profile (e.g., strobe light or SOS signal).

As an example of the threshold being crossed, if the attitude difference is large enough to warrant a change in the light output, such as via a different lighting profile, then processor 504 may perform any of the operations of updating, transitioning, and/or instructing (310, 312, and/or 314) accordingly, as described above. The threshold may prevent unnecessary updating, transitioning, instructing, or other operations, where the difference detected by certain sensors is not sufficient to warrant a change in the light output from the light-emitting element. In some embodiments, an upper threshold may be referenced, so as to avoid transitioning light profiles in response to what may be spurious data from a likely malfunction or misreading by a given sensor.

In combination with activity classification and activity-specific rules, for example, for mountain biking with a head-mounted adaptive-illumination device, detecting an attitude change from a low-facing (e.g., below horizon) attitude to a horizontally facing (e.g., at or near the horizon) attitude or orientation of a rider's head (e.g., by a double integral of angular acceleration, by applying a Kalman filter to fuse inertial and angular data into orientation data to infer specific head movement, by applying a Kalman filter to fuse orientation data and acceleration/velocity data for increased precision of inferences, and/or by other similar or equivalent techniques), a lighting profile with wide-spread diffuse illumination may be transitioned to a longer-range light beam, to allow the horizontally facing rider to see farther ahead.

Similarly, an acceleration (increase in speed, integrating acceleration data) may warrant transitioning to a lighting profile with brighter or longer-range light beam to allow the faster-moving rider to see farther ahead. Profiles may be transitioned in reverse, or differently, in response to the rider's head tilting downward, or with deceleration to a slower speed, in some embodiments.

Additionally, or alternatively, via a sensor such as at least one microphone or other sound transducer(s) configured to detect at least one acoustic wave, processor 504 may be configured to detect an audible change or sound pattern outside the device or system that includes processor 504, from a first acoustic state to a second acoustic state, based at least in part on a first signal generated by the photodetector being different from a second signal generated by the photodetector. Thus, processor 504 may be configured to evaluate an acoustic difference between the first acoustic state and the second acoustic state, based at least in part on the sound change as detected.

Following the above example of the audible change or sound pattern, processor 504 may be configured to determine, based at least in part on the audible change or sound pattern, that at least one first threshold of the first lighting profile has been crossed. In response to the determining that the threshold has been crossed, processor 504 may perform any of the operations of updating, transitioning, and/or instructing (310, 312, and/or 314) as described above. Thus, with a significant increase or decrease in amount of ambient noise (e.g., wind noise, water noise, engine noise, etc., in the at least one acoustic wave detected by the at least one microphone), the light output of the light-emitting element may be increased or decreased in accordance with a corresponding lighting profile. In some embodiments, an upper threshold may be referenced, so as to avoid transitioning light profiles in response to what may be spurious data from a likely malfunction or misreading by a given sensor.

Additionally, or alternatively, using any number of deterministic or probabilistic routines, models, algorithms, or other processes for pattern recognition, a pattern may be recognized in the at least one acoustic wave, so as to identify an ambient noise source (e.g., wind, water, engine, etc.), which may further feed back into activity classification, for example. In a further use case for illumination devices equipped with at least one microphone and pattern recognition capabilities, processor 504 may be configured to accept audible control signals.

Audible control signals may include voice commands, which may be spoken by a wearer of a wearable illumination device with these features enabled. In some embodiments, voice commands may be recognized from a predetermined set of specific patterns, which may be generic or customized by a given user. Additionally, or alternatively, voice commands may be handled by voice-enabled controllers (voice control 234), natural language processing (NLP), or equivalent processing methods that may use remote processing capabilities or that may function offline. Additionally, or alternatively, audible control signals may include non-verbal audible signals, such as patterns of talking, whistling, humming, singing, clapping, clicking, snapping, sounding of horns or bells (e.g., mounted on vehicles), or the like, to name a few non-limiting examples.

As a result of implementing and/or performing enhanced techniques as described herein, users of enhanced adaptive-illumination devices per this disclosure may effectively realize an autonomous wearable light, which is not only hands-free but also embodies a more ergonomic and intuitive "control-less" concept, at least to the effect that users may be able to reduce or avoid manual configuration and adjustment during use. These benefits may be further built upon through auto-tuning via repeated use and effective machine learning, in some example use cases.

Figure 4:
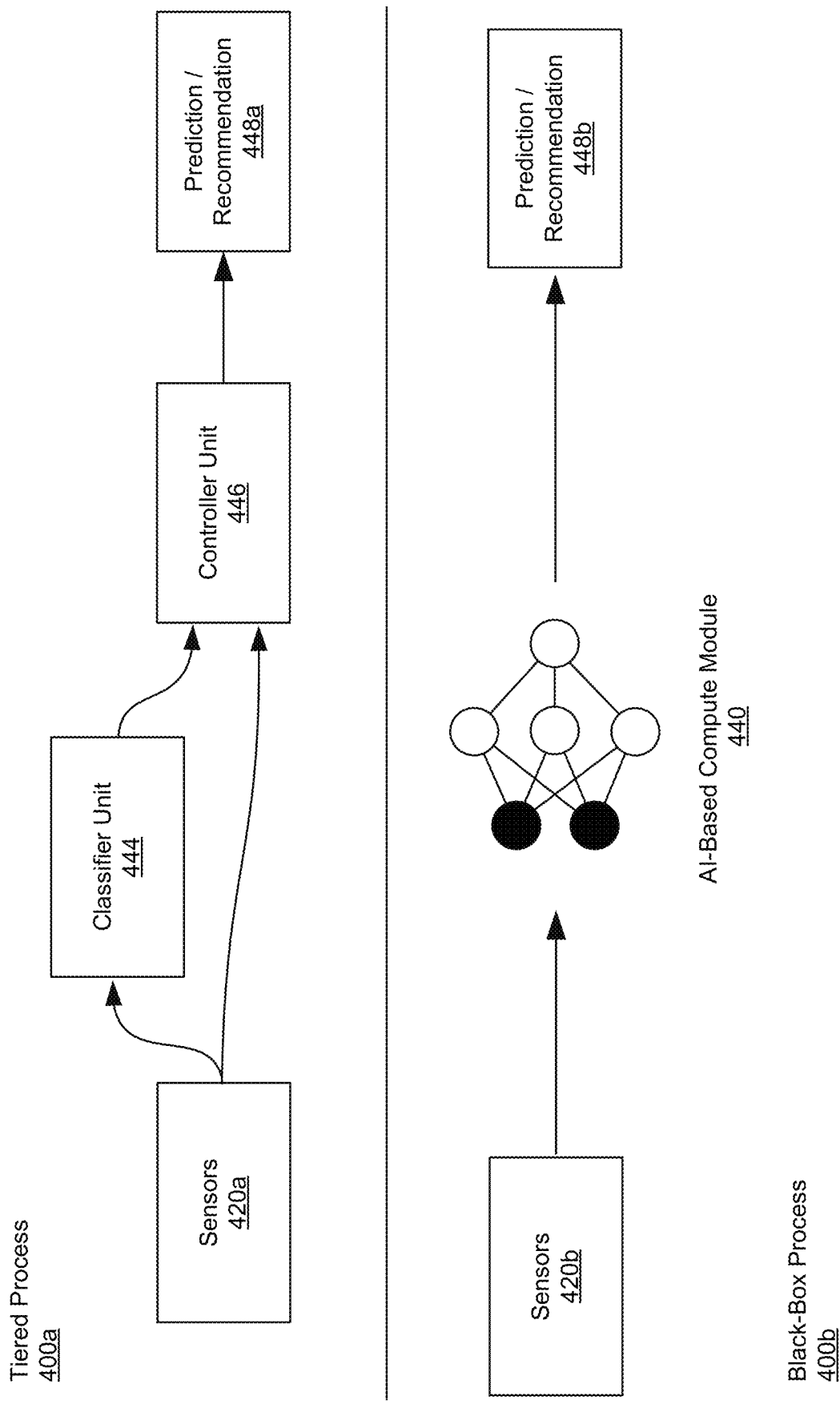
FIG. 4 depicts alternative data flows underlying certain examples of adaptive illumination, according to some embodiments of the present disclosure.

FIG. 4 depicts alternative data flows underlying certain examples of adaptive illumination, according to some embodiments of the present disclosure.

At the top of FIG. 4 is a tiered process 400*a*, in which sensor data may be provided from sensor(s) 420*a* as input both to a classifier unit, on a first level, and to controller unit 446, which may apply activity-specific rules using decision logic, on a second level dependent on the first level. Thus, if the classifier unit 444 updates an activity classification based on specific sensor data, then the controller unit 446 may apply different activity-specific rules to the same specific sensor data from sensors 420*a*.

Any suitable classification model, algorithm, routine, or equivalent process may be used by classifier unit 444, including neural-network-based ML processes. The same (additionally, or alternatively, including a predictor unit 445 (not shown)) may apply for the decision logic of controller unit 446 to yield a prediction or calculation of what the output of an adaptive-illumination device may be in the present or in a near-future state. In some embodiments, controller unit 446 may implement decision logic, such as by a deterministic binary tree, for example. In such embodiments, other low-overhead classification may also be used with the classifier unit 444, e.g., shallow ANNs, linear SVM, threshold-based filtering, etc., for low-power, offline processing. The result of such processing, for a given device state or sample of sensor data, may be an output 448*a* including calculated prediction or recommendation, provided as an illumination proposal, lighting profile, and/or instruction(s) to output light from a light-emitting element accordingly.

Additionally, or alternatively, a black-box process 400*b* at the bottom of FIG. 4 shows a separate flow architecture may involve feeding sensor data from sensors 420*b*, any other parameters (such as activities or lighting profiles) or other input data (not shown), into a neural network, ML model or process, or other AI-based compute module 440 for classification and/or prediction/recommendation output 448*b*.

The AI-based processes used with compute module 440 may thus include similar functionality as with other algorithms, data structures, and other processes (e.g., decision trees, conditional logic) that may be used to implement a flat or tiered process, such as tiered process 400*a*, but may additionally or alternatively leverage ML capabilities to facilitate refinement or evolution of black-box process 400*b* over time. This computational architecture may thus provide recommendations, proposals, and/or profiles that become more relevant to a user for adaptive illumination the more the user engages with an adaptive-illumination platform that uses black-box process 400*b*. Ensuing result(s) of such processing, for a given device state or sample of sensor data, may be an output 448*b* including calculated prediction or recommendation, provided as an illumination proposal, lighting profile, and/or instruction(s) to output light from at least one light-emitting element accordingly.

However, whereas controller unit 446 may depend on predefined activity-specific rules that implement domain-specific knowledge, for predefined activities (e.g., skiing, cycling, mountaineering, etc.), compute module 440 may deliver suitable results even without preprogrammed rules or domain knowledge. In this way, the actual activity may be treated as a black box by compute module 440.

Here, compute module 440 may instead learn from certain training or calibration runs, which may involve some manual adjustment or correction by a user. Via the sensor data, user configurations, and other inputs, compute module 440 may, in turn, develop its own effective activity classifications, rules, illumination proposals/lighting profiles, etc., for essentially any variety of activities, without preloaded data sets or preprogrammed rules for the activities to which it may adapt, e.g., via AI/ML or ANN techniques, according to some example embodiments.

Figure 5:
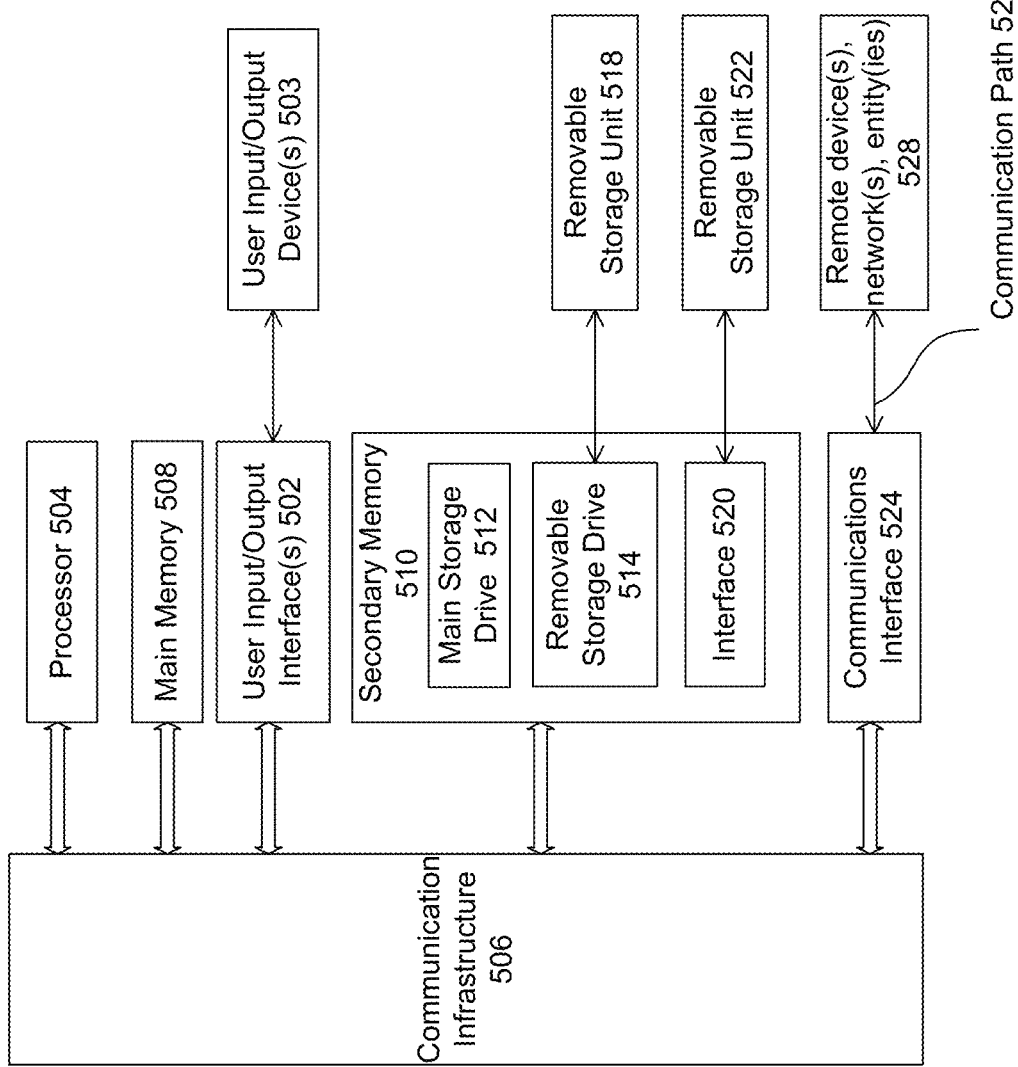
FIG. 5 is a block diagram of an example computer system useful for implementing various embodiments of the present disclosure.

Various embodiments may be implemented, for example, using one or more computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a bus or communication infrastructure 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. With capabilities of general-purpose computing on graphics processing units (GPGPU), the GPU may be useful in various other applications. The GPU may have a parallel structure that is efficient for parallel processing of large blocks of data, such as mathematically intensive data common to computer graphics applications, images, videos, vector processing, array processing, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive as a main storage drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Wireless connections to the Internet may be implemented via standard protocols (e.g., CDMA, GSM, GPRS/EDGE, 2G, 2.5G, 3G, 4G LTE, 5G, 5G-NR, 6G, or equivalent), Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer-useable or computer-readable storage medium having control logic (software or instructions) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not any other section, is intended to be used to interpret the claims. Other sections may set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc., using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

We claim:

1. A wearable adaptive-illumination device, comprising:
   a plurality of sensors;
   a light-emitting element;
   at least one processor;
   a memory communicatively coupled with the at least one processor and comprising instructions, stored in the memory and that, when executed by the at least one processor, cause the at least one processor to perform operations comprising:
      receiving first sensor data generated by at least one of the plurality of sensors, wherein the plurality of sensors comprises a photodetector;
      selecting, based at least in part on the first sensor data, a first lighting profile stored in the memory;
      instructing the light-emitting element to emit light in accordance with the first lighting profile;
      receiving second sensor data generated by the at least one of the plurality of sensors;
      updating a classification stored in the memory, in response to the second sensor data being different from the first sensor data, wherein the classification corresponds to an activity;
      transitioning from the first lighting profile to a second lighting profile stored in the memory, in response to the updating;
      instructing the light-emitting element to emit light in accordance with the second lighting profile;
      detecting a lighting change outside the wearable adaptive-illumination device from a first lighting state to a second lighting state, based at least in part on a first signal generated by the photodetector being different from a second signal generated by the photodetector;
      evaluating a lighting difference between the first lighting state and the second lighting state, based at least in part on the lighting change;
      determining, based at least in part on the lighting difference, that at least one first threshold of the first lighting profile has been crossed; and
      in response to the determining, performing the updating, the transitioning, or the instructing the light-emitting element to emit light in accordance with the first or second lighting profiles.

2. The wearable adaptive-illumination device of claim 1, wherein the plurality of sensors comprises an inertial sensor.

3. The wearable adaptive-illumination device of claim 2, wherein the instructions, stored in the memory, when executed by the at least one processor, cause the at least one processor to perform the operations further comprising:
   detecting an attitude change from a first attitude state to a second attitude state, based at least in part on first data generated by the inertial sensor being different from second data generated by the inertial sensor, the first or second data comprising acceleration data, orientation data, angular data, or a combination thereof;
   evaluating an attitude difference between the first attitude state and the second attitude state;
   determining, based at least in part on the attitude difference, that at least one first threshold of the first lighting profile has been crossed; and
   in response to the determining, performing the updating, the transitioning, or the instructing the light-emitting element to emit light in accordance with the first or second lighting profiles.

4. The wearable adaptive-illumination device of claim 3, wherein the instructions, stored in the memory, when executed by the at least one processor, cause the at least one processor to perform operations further comprising:
   classifying the activity state of the wearable adaptive-illumination device, based at least in part on the attitude change;
   calculating a prediction for the light output of the light-emitting element, based at least in part on the classifying; and
   in response to the classifying or the calculating, performing the transitioning or the instructing the light-emitting element to emit light in accordance with the first or second lighting profiles.

5. The wearable adaptive-illumination device of claim 4, wherein at least one machine-learning model is a basis for at least one of the classifying or the calculating.

6. The wearable adaptive-illumination device of claim 2, wherein the plurality of sensors comprises an acoustic transducer.

7. The wearable adaptive-illumination device of claim 6, wherein the instructions, stored in the memory, when executed by the at least one processor, cause the at least one processor to perform operations further comprising:
   detecting at least one audio signal generated by the acoustic transducer, in response to at least one acoustic wave;
   recognizing a pattern in the at least one acoustic wave, based at least in part on at least one audio signal generated by the acoustic transducer; and
   in response to the recognizing the pattern, performing the updating, the transitioning, or the instructing the light-emitting element to emit light in accordance with the first or second lighting profiles.

8. The wearable adaptive-illumination device of claim 7, wherein the pattern corresponds to a voice command.

9. The wearable adaptive-illumination device of claim 7, wherein the pattern corresponds to a change in an amount of wind noise in the at least one acoustic wave.

10. The wearable adaptive-illumination device of claim 1, wherein the instructions, stored in the memory, when executed by the at least one processor, cause the at least one processor to perform operations further comprising:
  classifying the activity state of the wearable adaptive-illumination device, based at least in part on the lighting change;
  calculating a prediction for the light output of the light-emitting element, based at least in part on the classifying; and
  in response to the classifying or the calculating, performing the transitioning or the instructing the light-emitting element to emit light in accordance with the first or second lighting profiles.

11. The wearable adaptive-illumination device of claim 10, wherein at least one machine-learning model is a basis for at least one of the classifying or the calculating.

12. The wearable adaptive-illumination device of claim 1, wherein the plurality of sensors comprises an acoustic transducer.

13. The wearable adaptive-illumination device of claim 12, wherein the instructions, stored in the memory, when executed by the at least one computer processor, cause the at least one processor to perform operations further comprising:
  detecting at least one audio signal generated by the acoustic transducer, in response to at least one acoustic wave;
  recognizing a pattern in the at least one acoustic wave, based at least in part on at least one audio signal generated by the acoustic transducer; and
  in response to the recognizing the pattern, performing the updating, the transitioning, or the instructing the light-emitting element to emit light in accordance with the first or second lighting profiles.

14. The wearable adaptive-illumination device of claim 13, wherein the pattern corresponds to a voice command.

15. The wearable adaptive-illumination device of claim 13, wherein the pattern corresponds to a change in an amount of wind noise in the at least one acoustic wave.

16. A computer-implemented method, comprising:
  receiving, via at least one processor, first sensor data generated by at least one of a plurality of sensors, wherein the plurality of sensors comprises an inertial sensor;
  selecting, via the at least one computer processor, based at least in part on the first sensor data, a first lighting profile stored in the memory;
  instructing, via the at least one computer processor, a light-emitting element to emit light in accordance with the first lighting profile;
  receiving, via the at least one computer processor, second sensor data generated by the at least one of the plurality of sensors;
  updating, via the at least one computer processor, a classification stored in the memory, in response to the second sensor data being different from the first sensor data, wherein the classification corresponds to an activity;
  transitioning, via the at least one computer processor, from the first lighting profile to a second lighting profile stored in the memory, in response to the updating;
  instructing, via the at least one computer processor, the light-emitting element to emit light in accordance with the second lighting profile;
  detecting, via the at least one computer processor, an attitude change from a first attitude state to a second attitude state, based at least in part on first data generated by the inertial sensor being different from second data generated by the inertial sensor, the first or second data comprising acceleration data, orientation data, angular data, or a combination thereof;
  evaluating, via the at least one computer processor, an attitude difference between the first attitude state and the second attitude state;
  determining, via the at least one computer processor, based at least in part on the attitude difference, that at least one first threshold of the first lighting profile has been crossed; and
  in response to the determining, performing the updating, the transitioning, or the instructing the light-emitting element to emit light in accordance with the first or second lighting profiles.

17. The computer-implemented method of claim 16, further comprising:
  classifying, via the at least one computer processor, the activity state of a user, based at least in part on the attitude change;
  calculating, via the at least one computer processor, a prediction for the light output of the light-emitting element, based at least in part on the classifying; and
  in response to the classifying or the calculating, performing the transitioning or the instructing the light-emitting element to emit light in accordance with the first or second lighting profiles.

18. The computer-implemented method of claim 17, wherein at least one machine-learning model is a basis for at least one of the classifying or the calculating.

19. A computer-implemented method, comprising:
  receiving, via at least one processor, first sensor data generated by at least one of a plurality of sensors, wherein the plurality of sensors comprises a photodetector;
  selecting, via the at least one computer processor, based at least in part on the first sensor data, a first lighting profile stored in the memory;
  instructing, via the at least one computer processor, a light-emitting element to emit light in accordance with the first lighting profile;
  receiving, via the at least one computer processor, second sensor data generated by the at least one of the plurality of sensors;
  updating, via the at least one computer processor, a classification stored in the memory, in response to the second sensor data being different from the first sensor data, wherein the classification corresponds to an activity;
  transitioning, via the at least one computer processor, from the first lighting profile to a second lighting profile stored in the memory, in response to the updating;
  instructing, via the at least one computer processor, the light-emitting element to emit light in accordance with the second lighting profile;
  detecting, via the at least one computer processor, a lighting change from a first lighting state to a second lighting state, based at least in part on a first signal generated by the photodetector being different from a second signal generated by the photodetector;
  evaluating, via the at least one computer processor, a lighting difference between the first lighting state and the second lighting state, based at least in part on the lighting change;

determining, via the at least one computer processor, based at least in part on the lighting difference, that at least one first threshold of the first lighting profile has been crossed; and in response to the determining, performing the updating, the transitioning, or the instructing the light-emitting element to emit light in accordance with the first or second lighting profiles.

20. The computer-implemented method of claim 19, further comprising:

classifying, via the at least one computer processor, the activity state of a user, based at least in part on the lighting change;

calculating, via the at least one computer processor, a prediction for the light output of the light-emitting element, based at least in part on the classifying; and in response to the classifying or the calculating, performing the transitioning or the instructing the light-emitting element to emit light in accordance with the first or second lighting profiles.

21. The computer-implemented method of claim 20, wherein at least one machine-learning model is a basis for at least one of the classifying or the calculating.

22. A computer-implemented method, comprising:

receiving, via at least one processor, first sensor data generated by at least one of a plurality of sensors, wherein the plurality of sensors comprises an acoustic transducer;

selecting, via the at least one computer processor, based at least in part on the first sensor data, a first lighting profile stored in the memory;

instructing, via the at least one computer processor, a light-emitting element to emit light in accordance with the first lighting profile;

receiving, via the at least one computer processor, second sensor data generated by the at least one of the plurality of sensors;

updating, via the at least one computer processor, a classification stored in the memory, in response to the second sensor data being different from the first sensor data, wherein the classification corresponds to an activity;

transitioning, via the at least one computer processor, from the first lighting profile to a second lighting profile stored in the memory, in response to the updating;

instructing, via the at least one computer processor, the light-emitting element to emit light in accordance with the second lighting profile;

detecting, via the at least one computer processor, at least one audio signal generated by the acoustic transducer, in response to at least one acoustic wave;

recognizing, via the at least one computer processor, a pattern in the at least one acoustic wave, based at least in part on at least one audio signal generated by the acoustic transducer; and in response to the recognizing the pattern, performing the updating, the transitioning, or the instructing the light-emitting element to emit light in accordance with the first or second lighting profiles.

23. The computer-implemented method of claim 22, wherein the pattern corresponds to a voice command.

24. The computer-implemented method of claim 22, wherein the pattern corresponds to a change in an amount of wind noise in the at least one acoustic wave.

25. A wearable adaptive-illumination device, comprising:
a plurality of sensors;
a light-emitting element;
at least one processor;
a memory communicatively coupled with the at least one processor and comprising instructions, stored in the memory and that, when executed by the at least one processor, cause the at least one processor to perform operations comprising:

receiving first sensor data generated by at least one of the plurality of sensors, wherein the plurality of sensors comprises an inertial sensor;

selecting, based at least in part on the first sensor data, a first lighting profile stored in the memory;

instructing the light-emitting element to emit light in accordance with the first lighting profile;

receiving second sensor data generated by the at least one of the plurality of sensors;

updating a classification stored in the memory, in response to the second sensor data being different from the first sensor data, wherein the classification corresponds to an activity;

transitioning from the first lighting profile to a second lighting profile stored in the memory, in response to the updating;

instructing the light-emitting element to emit light in accordance with the second lighting profile;

detecting an attitude change from a first attitude state to a second attitude state, based at least in part on first data generated by the inertial sensor being different from second data generated by the inertial sensor, the first or second data comprising acceleration data, orientation data, angular data, or a combination thereof;

evaluating an attitude difference between the first attitude state and the second attitude state;

determining, based at least in part on the attitude difference, that at least one first threshold of the first lighting profile has been crossed; and in response to the determining, performing the updating, the transitioning, or the instructing the light-emitting element to emit light in accordance with the first or second lighting profiles.

26. The wearable adaptive-illumination device of claim 25, wherein the instructions, stored in the memory, when executed by the at least one processor, cause the at least one processor to perform operations further comprising:

classifying the activity state of a user, based at least in part on the attitude change;

calculating a prediction for the light output of the light-emitting element, based at least in part on the classifying; and in response to the classifying or the calculating, performing the transitioning or the instructing the light-emitting element to emit light in accordance with the first or second lighting profiles.

27. The wearable adaptive-illumination device of claim 26, wherein at least one machine-learning model is a basis for at least one of the classifying or the calculating.

28. A wearable adaptive-illumination device, comprising:
a plurality of sensors;
a light-emitting element;
at least one processor;
a memory communicatively coupled with the at least one processor and comprising instructions, stored in the memory and that, when executed by the at least one processor, cause the at least one processor to perform operations comprising:

receiving first sensor data generated by at least one of the plurality of sensors, wherein the plurality of sensors comprises an acoustic transducer;

selecting, based at least in part on the first sensor data, a first lighting profile stored in the memory;

instructing the light-emitting element to emit light in accordance with the first lighting profile;

receiving second sensor data generated by the at least one of the plurality of sensors;

updating a classification stored in the memory, in response to the second sensor data being different from the first sensor data, wherein the classification corresponds to an activity;

transitioning from the first lighting profile to a second lighting profile stored in the memory, in response to the updating;

instructing the light-emitting element to emit light in accordance with the second lighting profile;

detecting at least one audio signal generated by the acoustic transducer, in response to at least one acoustic wave;

recognizing a pattern in the at least one acoustic wave, based at least in part on at least one audio signal generated by the acoustic transducer; and in response to the detecting the pattern, performing the updating, the transitioning, or the instructing the light-emitting element to emit light in accordance with the first or second lighting profiles.

29. The wearable adaptive-illumination device of claim 28, wherein the pattern corresponds to a voice command.

30. The wearable adaptive-illumination device of claim 28, wherein the pattern corresponds to a change in an amount of wind noise in the at least one acoustic wave.

* * * * *